(12) United States Patent
Chang et al.

(10) Patent No.: US 11,281,755 B2
(45) Date of Patent: Mar. 22, 2022

(54) SYSTEMS AND METHODS FOR SECURE BIOMETRIC IDENTIFICATION USING RECORDED PRESSURE

(71) Applicants: Hong Chang, Mountain View, CA (US); Alex C Lee, Mountain View, CA (US)

(72) Inventors: Hong Chang, Mountain View, CA (US); Alex C Lee, Mountain View, CA (US)

( * ) Notice: Subject to any disclaimer, the term of this patent is extended or adjusted under 35 U.S.C. 154(b) by 181 days.

(21) Appl. No.: 16/548,611

(22) Filed: Aug. 22, 2019

(65) Prior Publication Data

US 2020/0089858 A1 Mar. 19, 2020

Related U.S. Application Data

(60) Provisional application No. 62/730,948, filed on Sep. 13, 2018.

(51) Int. Cl.
| | | |
|---|---|---|
| *G06F 21/32* | (2013.01) | |
| *G06K 9/62* | (2006.01) | |
| *G06N 20/00* | (2019.01) | |
| *G06F 3/0487* | (2013.01) | |

(52) U.S. Cl.
CPC ............ *G06F 21/32* (2013.01); *G06F 3/0487* (2013.01); *G06K 9/6255* (2013.01); *G06N 20/00* (2019.01)

(58) Field of Classification Search
CPC ..... G06F 21/32; G06F 3/0487; G06K 9/6255; G06N 20/00
See application file for complete search history.

(56) References Cited

U.S. PATENT DOCUMENTS

| | | |
|---|---|---|
| 7,356,168 B2 | 4/2008 | Tavares |
| 2011/0050394 A1 | 3/2011 | Zhang et al. |
| 2014/0157911 A1 | 6/2014 | Sarrafzadeh et al. |
| 2015/0282766 A1 | 10/2015 | Cole et al. |

(Continued)

FOREIGN PATENT DOCUMENTS

| | | |
|---|---|---|
| CA | 2976049 A1 | 8/2016 |
| WO | 2011072284 A1 | 6/2011 |

OTHER PUBLICATIONS

International Search Report and Written Opinion dated Nov. 19, 2019, in related International Patent Application No. PCT/US19/47770, filed Aug. 22, 2019 (11 pgs).

(Continued)

*Primary Examiner* — Ruiping Li
(74) *Attorney, Agent, or Firm* — North Weber & Baugh LLP; Michael North

(57) ABSTRACT

Described herein are systems and methods for secure biometric identification using dynamic pressure sensing that are convenient and intuitive to use. Accurate identification is accomplished by using a set of finely spaced analog sensors that measure and output a dynamic pressure profile that is then evaluated based on data from a trained model. The model comprises a number of personal biometric characteristics that may be used to uniquely identify a person, e.g., for authentication purposes, such as granting access to sensitive, confidential information in connection with an electronic commercial transaction, an Internet of Things (IoT) device, an automotive device, an identity and access management (IAM), or a robotic or high functioning touch sensing device.

16 Claims, 8 Drawing Sheets

(56) References Cited

U.S. PATENT DOCUMENTS

| | | | |
|---|---|---|---|
| 2016/0239201 A1 | 8/2016 | Wang et al. | |
| 2016/0239652 A1* | 8/2016 | Wang | G01L 5/0038 |
| 2017/0243359 A1 | 8/2017 | Bose et al. | |
| 2017/0322674 A1 | 11/2017 | Rosenberg et al. | |
| 2018/0263565 A1* | 9/2018 | Najafi | A61B 5/1123 |
| 2020/0380101 A1 | 12/2020 | Arii | |

OTHER PUBLICATIONS

[online], [Retrieved Nov. 13, 2019], Retrieved from the Internet <URL:https://www.google.com/search?q=bga+socket&tbm=isch&source=iu&ictx=1&fir=bGxdm2Kt0SSDfM%253A%252C3bl9ghq8UX2q8M%252C_&usg=AFrqEzeCA6efrw3Q4jsxJic7OXoJ_Pne4Q&s>, (16 pgs).

[online], [Retrieved Nov. 13, 2019]. Retrieved from the Internet <URL:https://www.peratech.com/m2436-100148-zf.html>, (5 pgs).

[online], [Retrieved Nov. 13, 2019], Retrieved from the Internet <URL:https://en.wikibooks.org/wiki/Robotics/Sensors/Pressure_Sensors> (2 pgs).

[online], [Retrieved Nov. 13, 2019], Retrieved from the Internet <URL:http://www.lessemf.com/fabric.html#253> (8 pgs).

[online], [Retrieved Nov. 13, 2019]. Retrieved from the Internet <URL:http://www.kobakant.at/DIY/?p=213> (9 pgs).

International Search Report and Written Opinion dated Nov. 7, 2019, in related International Patent Application No. PCT/US/2019/047769, filed Aug. 22, 2019 (9 pgs).

Non-Final Office Action dated Jan. 6, 2021 in related U.S. Appl. No. 16/548,589, (28 pgs).

Non-Final Office Action Response filed Mar. 4, 2021 in related U.S. Appl. No. 16/548,589, (9 pgs).

Final Office Action dated Mar. 23, 2021 in related U.S. Appl. No. 16/548,589, (24 pgs).

Non-Final Office Action dated Sep. 14, 2021 in related U.S. Appl. No. 16/548,589, (29 pgs).

* cited by examiner

200

SYSTEMS AND METHODS FOR SECURE BIOMETRIC IDENTIFICATION USING RECORDED PRESSURE

CROSS REFERENCE TO RELATED PATENT APPLICATIONS

The present application claims priority benefit, under 35 U.S.C. § 119(e), to commonly-assigned U.S. Patent Application No. 62/730,948, filed on Sep. 13, 2018, entitled "SYSTEMS AND METHODS FOR SECURE BIOMETRIC IDENTIFICATION USING RECORDED PRESSURE," listing as inventors, Hong Chang and Alex Cheuk Kwong Lee, which application is herein incorporated by reference as to its entire content. Each reference mentioned in this patent document is incorporated by reference herein in its entirety.

A. TECHNICAL FIELD

The present disclosure relates generally to systems and methods for personal identification based on human-machine interaction. More particularly, the present disclosure relates to biometric systems and methods that use dynamic pressure sensing to uniquely identify users.

B. BACKGROUND

Current biometric methods for personal identification use fingerprint data, retina scans, facial recognition methods, and the like. All these identification methods have in common that they operate on static biometric data, i.e., each of the biological traits are unique for every individual and serve as the basis for identification data that for practical purposes does not change over time. One obvious drawback of static biometric methods for personal identification is that a motivated attacker or identity thief can relatively easily circumvent such methods by copying and then reproducing the identifying data to mimic the presence of the user having the unique trait. For example, by presenting to a facial recognition system a color copy of a picture of a to-be-identified person, an imposter may successfully trick a security system into mistakenly recognizing the photo as that person, thus, defeating the security system and gaining access to confidential information.

Accordingly, what is needed are dynamic systems and methods that are virtually impossible to copy and, thus, inherently more secure for safeguarding confidential information.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF EMBODIMENTS

Figure 1:
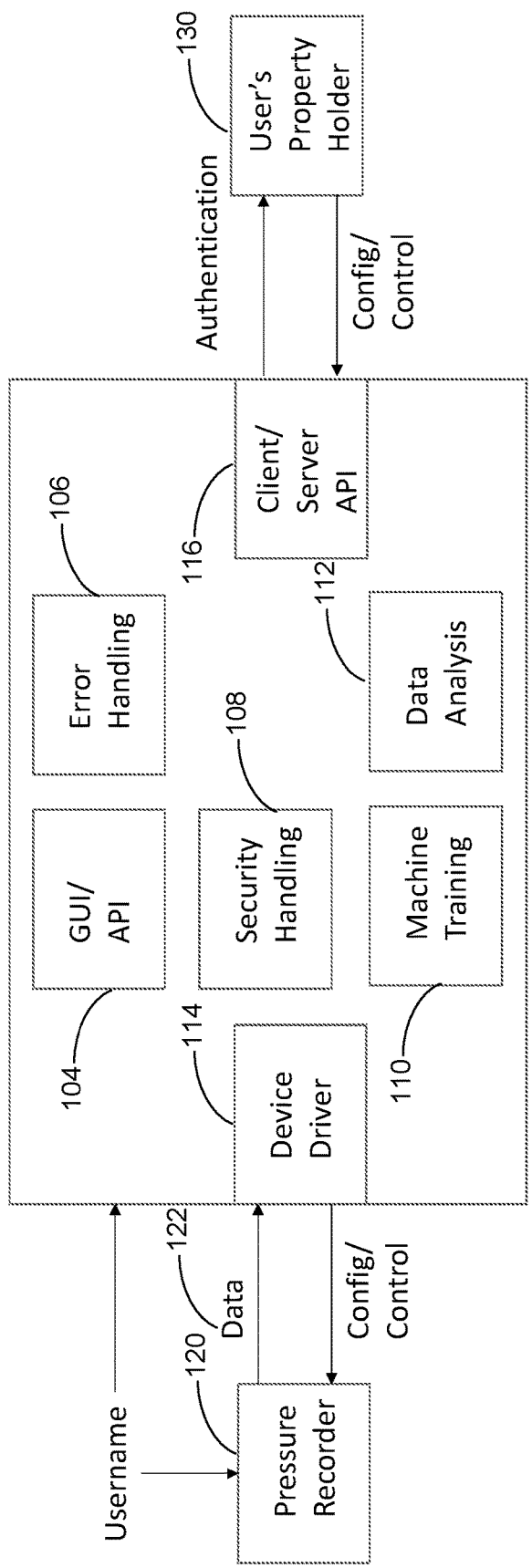
FIG. 1 is a simplified block diagram of a secure biometric identification system according to various embodiments of the present disclosure.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion components may be described as separate functional units, which may comprise sub-units. Those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. Furthermore, the use of memory, database, information base, data store, tables, hardware, and the like may be used herein to refer to system component or components into which information may be entered or otherwise recorded.

In this document "sensor array" and "electrical grid" are used interchangeably. Similarly, "pressure" and "force" may be used interchangeably, since as will be recognized by one of skilled in the art, pressure is defined as force applied onto a given surface area. Therefore, the term "pressure data" may refer to data that indicates pressure or a quantity, such as the physical quantity of force, from which pressure may be derived. The terms "pressure sensor" and "pixel" refer to a device for directly or indirectly measuring, at one or more locations, pressure or force, i.e., a quantity from which pressure data may be derived.

FIG. 1 is a simplified block diagram of a secure biometric identification system according to various embodiments of the present disclosure. System 100 comprises GUI/API 104, error handling module 106, security handling module 108, machine training module 110, data analysis module 112, device driver 114, client/server API 116, and pressure recorder 120. It is understood that modules described herein may be implemented by a state machine that uses wired logic or in software that executes instructions using a processing unit such as a microcontroller.

An example of pressure sensors and pressure recorder 120 that may benefit from the teachings of the present disclosure are the systems and methods disclosed in U.S. Provisional Patent Application, Ser. No. 62/729,738, entitled "Pressure Recording Systems and Methods for Biometric Identification," filed on Sep. 11, 2018, 2018 and listing as inventors Alex Cheuk Kwong Lee and Hong Chang, which patent application is incorporated herein by reference as to its entire content and for all purposes.

In embodiments, input data 122 may comprise data provided by a multi-dimensional array of pressure sensors, e.g., spatial and temporal pressure data, such that the data captured by pressure recorder 120 may represent a spatial pressure distribution that may vary in time. In embodiments, input data 122 may be based on fusing data from any number of different types of sensors. Temporal variations in pressure data may be continuous or, e.g., according to discrete periodic time intervals. In embodiments, in order to ensure accuracy, input data 122 may comprise pressure measurement data saved in a time sequence as pixel buffer values.

It is noted that pressure recorder 120 may be a high-resolution pressure recorder 120 that may accurately capture, e.g., at dynamically changing measurement rates, the nuances of even unconsciously exerted gestures or movements when a user interacts with pressure sensor 120, e.g., using a finger or another body part. In embodiments, data analysis module 112 may apply relational analysis to infer or derive data 122 from a recorded movement by the user of pressure recorder 120, such as the user's rolling of a thumb while exerting pressure on a pressure touch sensor.

In embodiments, data 122 may be used to generate a recording (e.g., frame-by-frame) of pressure data that represents a spatial distribution, such that each frame may be assigned a number of (e.g., different) patterns or sub-patterns associated with a number of pressure regions. In embodiments, input data 122 may be pre-processed, e.g., sorted, grouped, and processed in a manner that facilitates the comparison of patterns to each other. In embodiments, pre-processing comprises fusing data from two or more sources that may comprise additional pressure-related data. Similarly, data from a number of regions may be processed before being used as training data and stored in the database.

In embodiments, input data 122 may be used to learn a set of (sub-)patterns that may be associated, e.g., with physical parameters, such speed, range, etc., and that may be used to identify a number of characteristics, e.g., within the pattern and/or a characteristic common to two or more patterns. In embodiments, patterns may be selected from (e.g., random) samples and stored in a database, e.g., in data analysis module 112. The learned characteristics may then be used to identify the user that caused the pattern(s) to be generated.

In embodiments, once input data 122 has been received, machine learning may be applied to it in order to identify patterns and other characteristics therein to generate the groups and sub-groups. In embodiments, each group and even each pixel may be assigned a weight factor, for example, based on a set of predetermined criteria. Machine training module 110 may adjust weight factors and other parameters over time, for example, to accommodate natural variations in a user's pressure and speed response. Machine training module 110 may apply and update training methods at various times, for example, based on gestures or motion that have been entered in to a database after being recognized as valid.

Once the temporal and spatial characteristic of input data 122 is successfully mapped to a known gesture in a database, a user may be recognized and the identification process may conclude. In embodiments, machine training module 110 accounts for tolerances, such as pressure variations caused by temperature and other environmental parameters that, otherwise, may negatively impact sensor accuracy and, thus, the accuracy of pressure recorder 120. It is understood that tolerances may also be user-related, e.g., due to factors such as the user's physical condition, which may vary over a length of time—whether within a day or within a decade.

The learning of patterns and characteristics may be performed by machine training module 110 that receives input data 122 as training data. In embodiments, in a training phase, for example, after in initialization procedure that may involve prompting the user to provide, via a user interface 104 (not shown), a username, the user may be prompted to exert pressure on the pressure sensor using his thumb, finger, or any other body part.

In embodiments, the user may be prompted to repeatedly press the sensor a number of times, e.g., with varying force, speed, and position, e.g., by rotating or rolling the thumb, resulting in different angles and/or sequences at which the pressure sensor captures user-generated pressure-related data, such as temporal and spatial information, and environmental parameters, such as temperature, etc., that may then be pre-processed and stored in a database, e.g., within pressure recorder 120.

In embodiments, machine training module 110 may use averaging techniques, for example, to average pressure data 122 over a period of time, area, or both, e.g., to determine a mean location of a pressure distribution (similar to a center of gravity) in each frame or region of a frame. Then an activity level may be defined and assigned to one or more regions within each frame. For example, pressure data within a region may be averaged to determine the highest number or active pixels, i.e., pixels having values above a certain threshold. In embodiments, within a given frame or based on data continuity, pixels may be defined as active based on a number of less active neighboring pixels. In embodiments, a number of active pixels may be clustered into sub-groups or regions that may be collectively categorized as an "active region." In embodiments, regions may be combined to form a data structure that represents a user profile that may then be used to identify the user. In embodiments, a set of most active pixels may be used to map one orientation into another to account for tilting of a reference frame.

In embodiments, a database may store historical data that may serve as contextual data for interpreting or evaluating the significance of sensor data from pressure recorder 120. For example, having knowledge of the fact that the user is a child or elderly person when generating a user profile may aid in more accurately interpreting data 122, for example, by taking into account that certain categories of users generally exert less pressure on the sensor when so prompted. Similarly, a child with not fully developed motor skills may behave less consistent and, thus, generate responses having more variation when asked to press the sensor five times in a row compared to an adult.

Therefore, in embodiments, historical data may be used as a factor in determining a confidence interval that may define what would be considered reliable data. Conversely, in embodiments, based on the assumption that no person can reproduce two identical gestures by applying pressure to a surface, receiving identical or highly accurate data may be used as an indicator that an attacker uses somehow duplicated or copied real-time pressure data to simulate a certain user's individual pressure characteristic. Thus, in embodiments, the confidence interval may be defined by a volatility index (VIX), i.e., range of expected accuracy or values that may account for sample-to-sample variations. Machine training module 110 may calculate the VIX, e.g., in the training phase, based on differences in the user input data, as a user-specific confidence range. In embodiments, to further increase security, security handling module 108 may, among other things, handle user access rights using any security model known in the art, and adjust confidence levels based on expected environments and user-related tolerances.

In embodiments, a time-sequenced compare database 602 may be used to generate a more compact hybrid compare database 606 that may than be communicated to a client side server where it may be reorganized into one or more non-time based groups based on AI-defined characteristics 614. In addition, the format of the database may be chosen to be significantly different from input data 122, such that there is no way to mimic input data 122 to circumvent the security of system 100. In embodiments, each data's character may be based on neighboring data and the data collected immediately prior or after. In embodiments, small random adjustments in input data 122 may significantly change the data character and, thus, trigger an identification failure.

In embodiments, input data 122 changes the content of the database buffer list 602, hybrid buffer list 606, and the new hybrid data structure 614, such that if an attacker manages to steal information contained in these databases, the static information would become obsolete. In embodiments, authentication does not depend upon a straightforward comparison of these databases, further thwarting any attackers.

In embodiments, to reduce computation time, only partial necessary database may be communicated to the client side. This keeps memory allocation at the client side reasonably small and reduces bandwidth requirements when transferring data over the internet. In embodiments, to reduce a computational burden, a number of frames that have the highest number of active pixels may be used for evaluation purposes. In embodiments, to accomplish this, pressure data within a frame may be summed to obtain the frame having the most active points, i.e., the frame associated with the highest total pressure. Then the frame may be used as the basis for generating a unique profile/highest resolution characteristic.

Figure 2A:
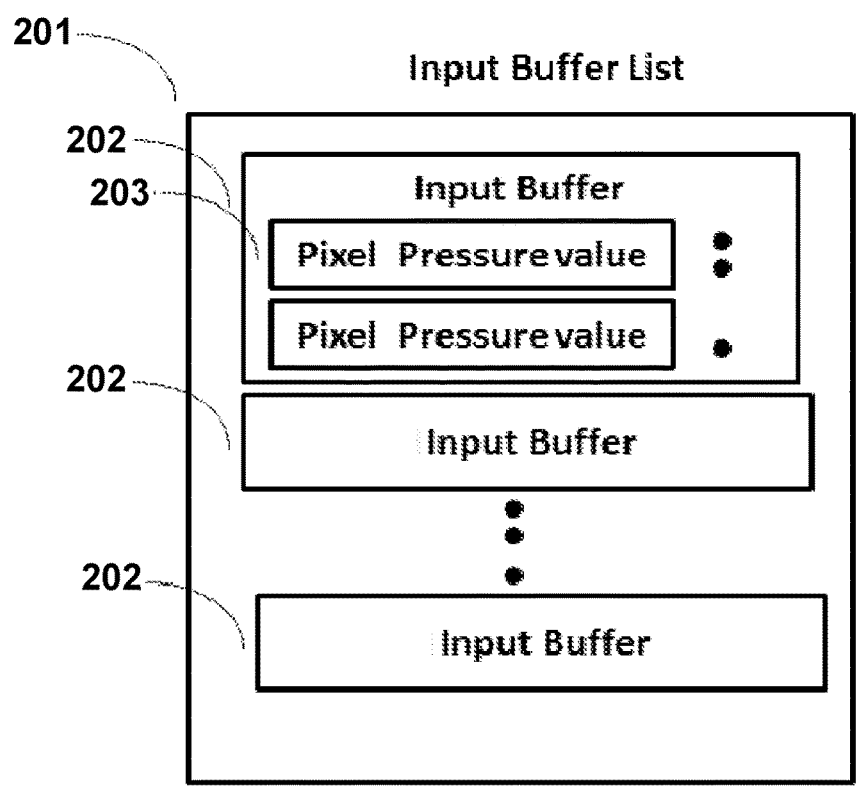
FIG. 2A illustrates an exemplary input buffer list according to various embodiments of the present disclosure.
Figure 2B:
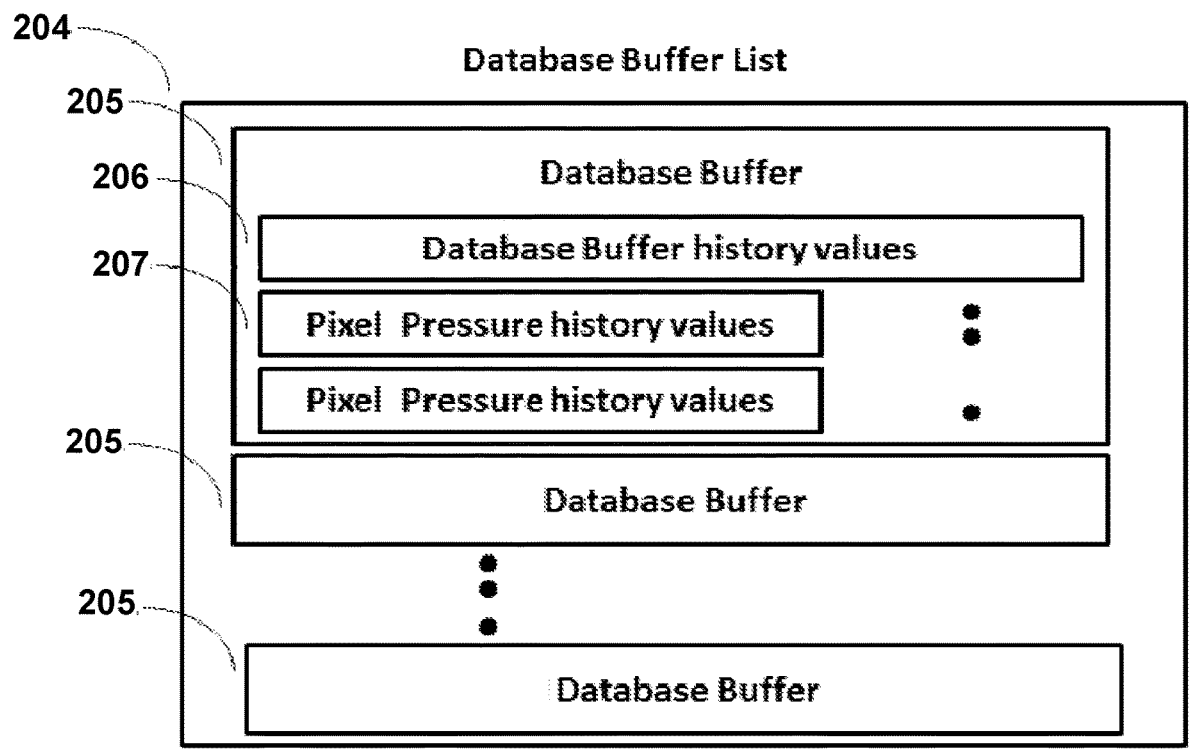
FIG. 2B illustrates an exemplary database buffer list according to various embodiments of the present disclosure.
Figure 3:
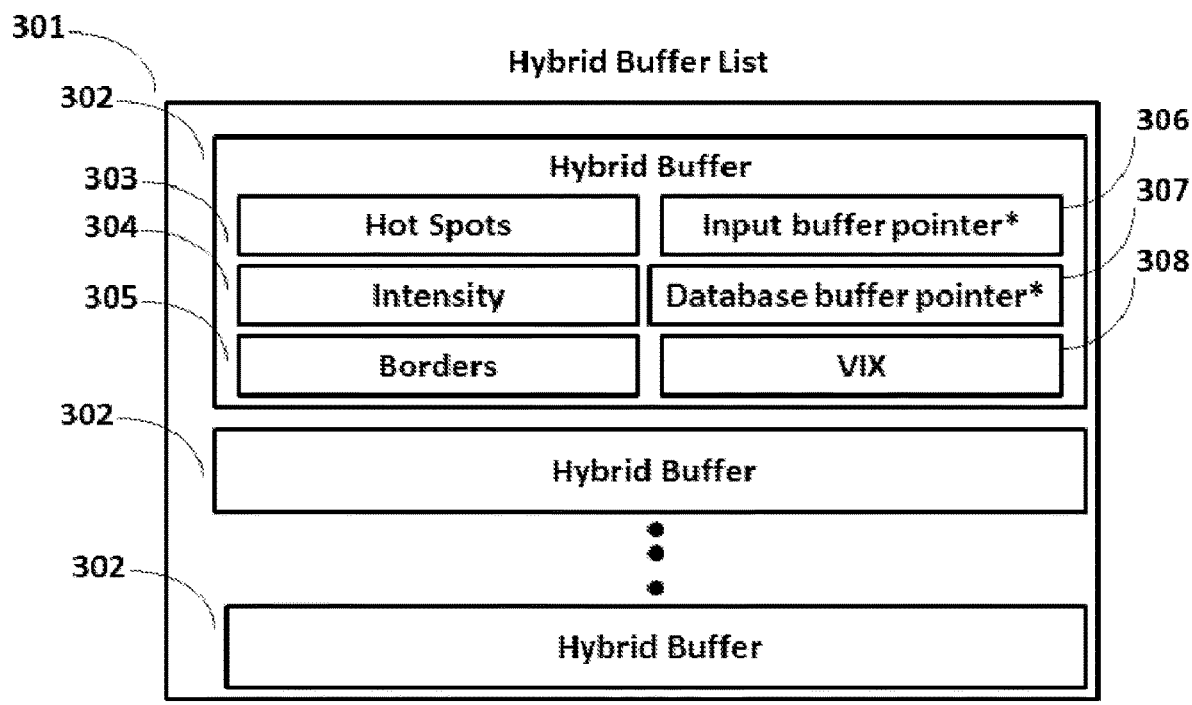
FIG. 3 illustrates an exemplary hybrid buffer list according to various embodiments of the present disclosure.
Figure 4:
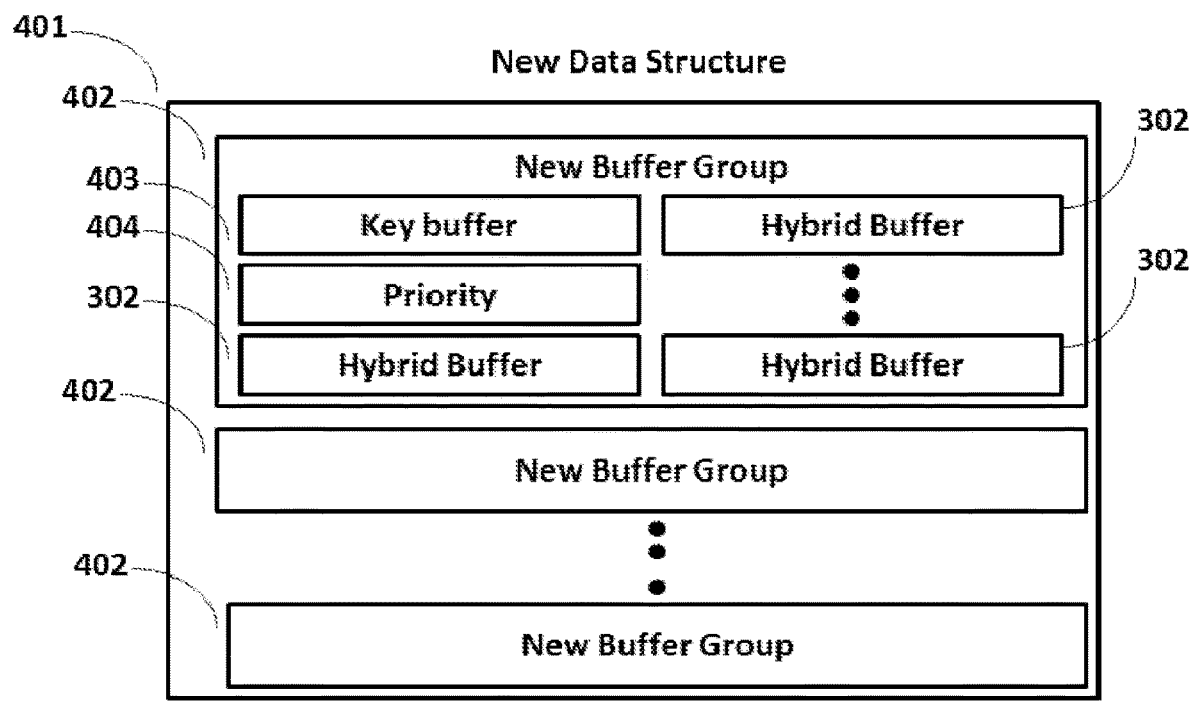
FIG. 4 illustrates an exemplary data structure according to various embodiments of the present disclosure.
Figure 5:
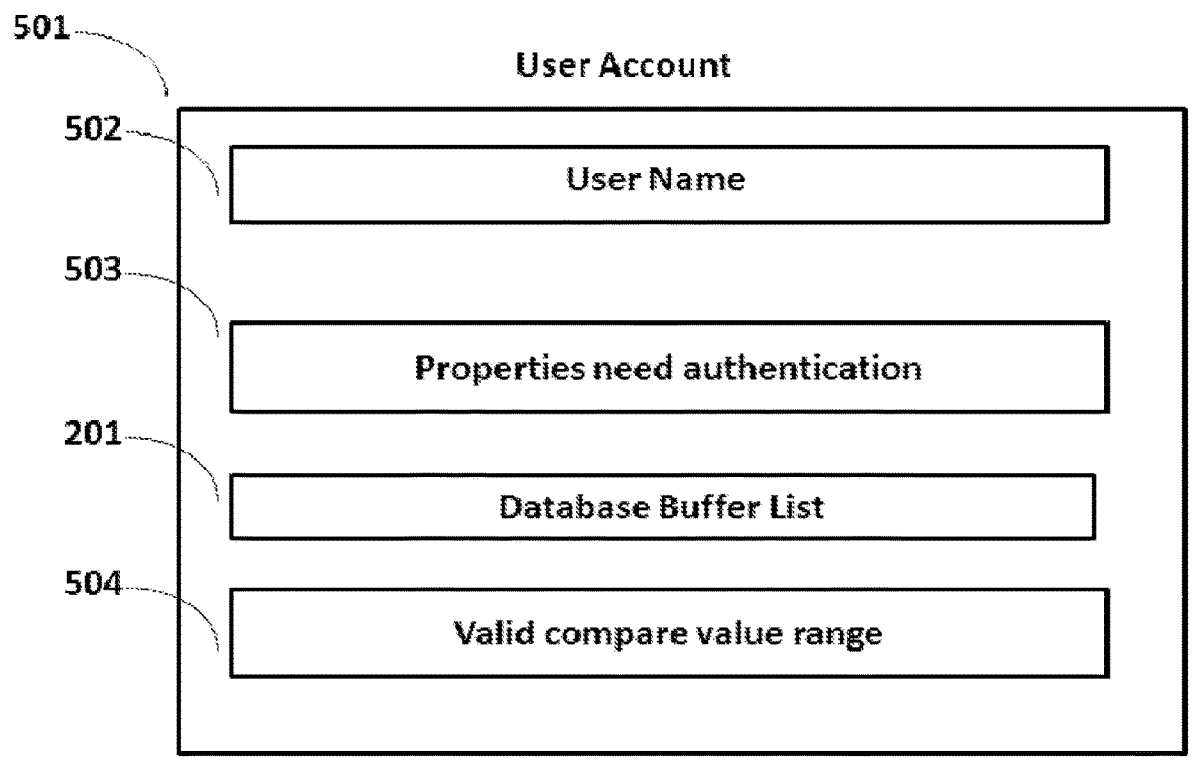
FIG. 5 illustrates an exemplary user account according to various embodiments of the present disclosure.

FIG. 2A illustrates an exemplary input buffer list according to various embodiments of the present disclosure. FIG. 2B illustrates an exemplary database buffer list according to various embodiments of the present disclosure. FIG. 3 illustrates an exemplary hybrid buffer list according to various embodiments of the present disclosure. FIG. 4 illustrates an exemplary data structure according to various embodiments of the present disclosure. FIG. 5 illustrates an exemplary user account according to various embodiments of the present disclosure.

Figure 6:
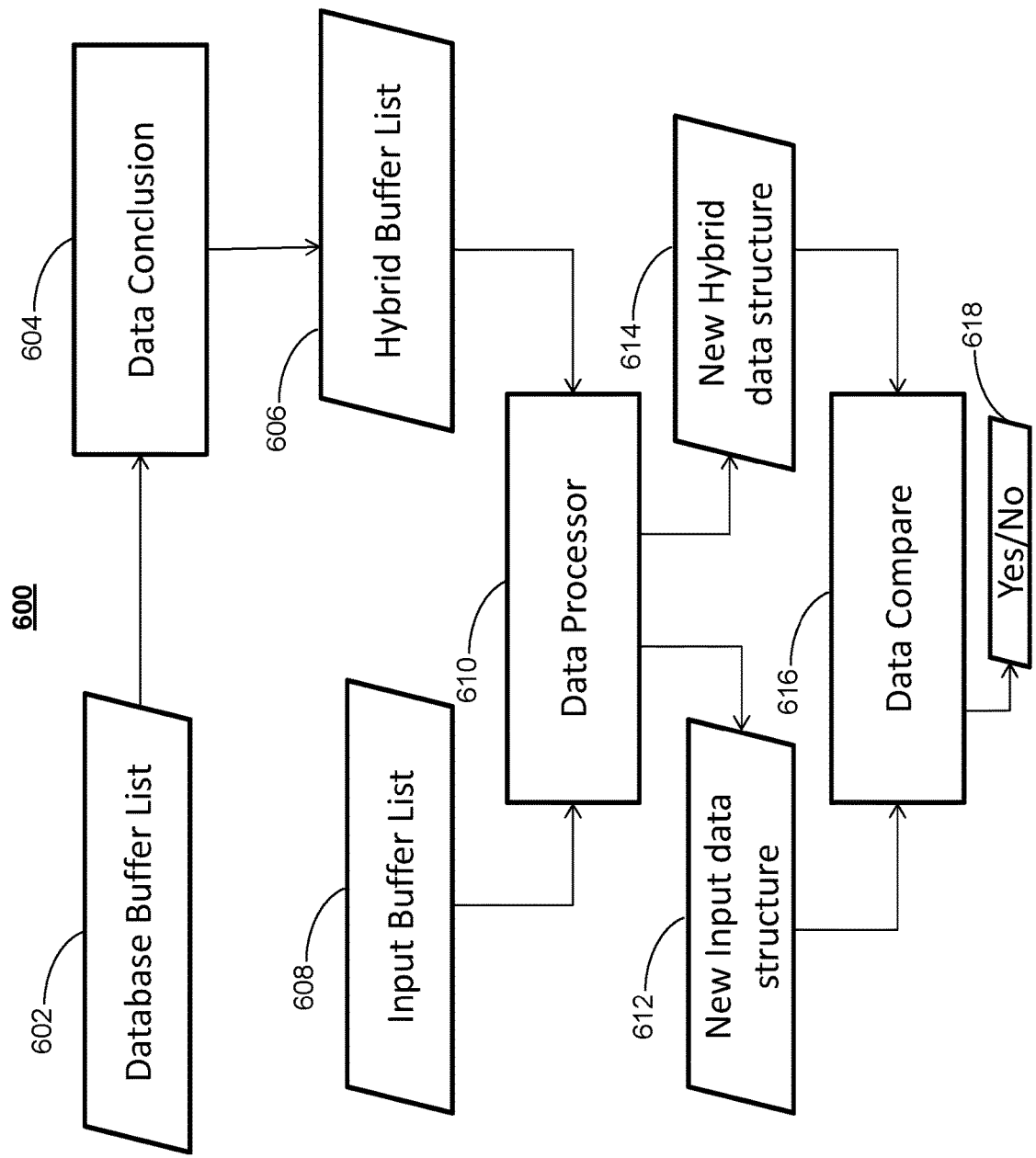
FIG. 6 is a flowchart of an illustrative process for secure biometric identification using recorded pressure according to various embodiments of the present disclosure.

FIG. 6 is a flowchart of an illustrative process for secure biometric identification using recorded pressure according to various embodiments of the present disclosure. In embodiments, data conclusion module 604 receives historical pixel pressure values from database buffer list 204 or pixel values from input buffer list 201 and computes therefrom a relative relation of pixels to their corresponding neighbors. It is understood that the computations may be performed for some or all pixel in a buffer. In embodiments, one or more threshold values are used to filter or sort pixel data 207 or 203, e.g., to find pixel boundaries 305, hot spots 303, intensity data 304, or a VIX data 308 for the buffer. Any of the filtered/sorted data may be combined into a hybrid package 302. In embodiments, the steps beginning with the computation may be repeated for each buffer 205 or 202 to output a list 301 of hybrid buffers 302 that may comprise information about pixel boundaries 305, hot spots 303, intensity data 304, and VIX data 308 for each hybrid buffer 302. In embodiments, hybrid buffer 302 may comprise input buffer pointers 306 and database buffer pointers 307 that may compose a null pointer.

In embodiments, data processor 610 receives input from at least one of input buffer list 201, hybrid buffer list 301, or database buffer list 204. When the input is not received from hybrid buffer list 301, then it may be received from input buffer list 201 or database buffer list 204.

In embodiments, data processor uses list 301 in data conclusion module 604 to find a key buffer having the largest border, the most hot spots, or the most intensity among hybrid buffers 302. In embodiments, data processor 610 reconstructs the buffers 302 into new groups 402 and assigns priorities 404 the groups, e.g., based on a calculated value representative of a defined characteristic. In embodiments, groups 402 may be divided into sub-groups that each undergo a similar process in a recursive function until new data structure 401 is output. New data structure 401 may or may not have a handle point back to original buffers 205 or 202 input to the function.

In embodiments, data compare module 616 receives as input at least one of hybrid buffer list 301, new input hybrid buffer list 301 with a handle pointed back the input buffer 202; or a valid compare value range 504 for a specific user. In embodiments, data compare module 616 aligns key buffer 403, compares each group 402, compares result multiply priority 404, and each group 402 result together, and compares the calculation result to range 504 for the user. Upon the calculation values falling within the range process 600 may resume with entering a data merge process described next.

Figure 7:
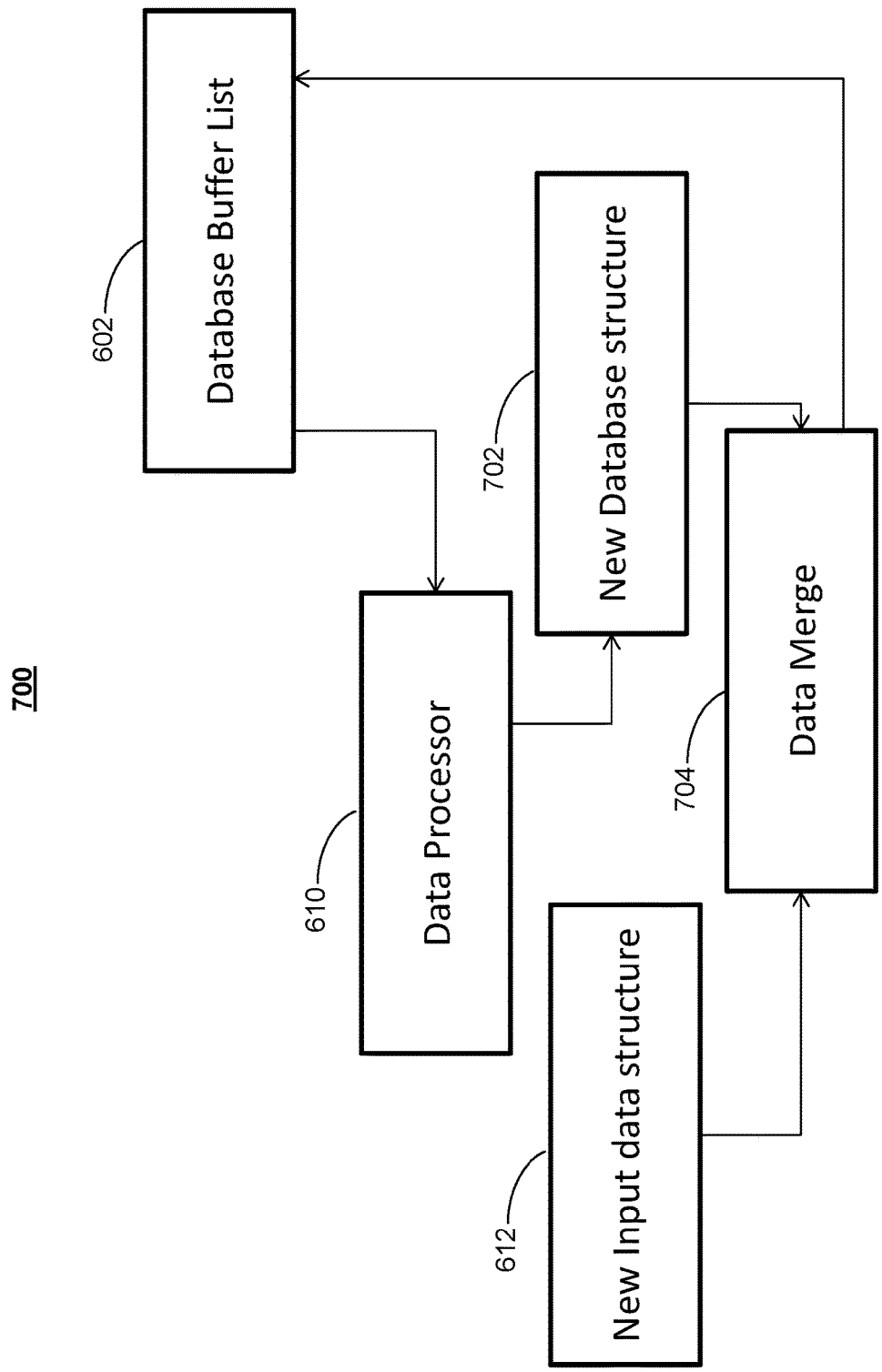
FIG. 7 is a flowchart of an illustrative process for merging data according to various embodiments of the present disclosure.

FIG. 7 is a flowchart of an illustrative process for merging data according to various embodiments of the present disclosure. In embodiments, data merge procedure 700 comprises receiving input data from new data structure 401 having a handle pointed back to database buffer 205 and new data structure 401 with a handle pointed back to input buffer 202.

In embodiments, data merge process 700 aligns key buffer 403, and separately merges each new buffer group 402. In embodiments, if two new data structures 401 do not have the same length within group 402, the respective buffer 205 may be trimming or padded, and a decision may be made by which one have stronger character.

In embodiments, procedure 700 comprises mapping in each frame each pixel 207 to historic pressure values 203 and recalculating pixel history values 207, recalculating database buffer history values 206, and/or recalculating valid compare value range 504 for a given user. In embodiments, new buffer groups 402 may be added together to form an updated new database buffer list 204. In embodiments, the results may be written into database buffer list 204.

Aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using application specific integrated circuits (ASICs), programmable arrays, digital signal processing circuitry, or the like. Accordingly, the terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks; optical media such as CD-ROMs and holographic devices; magneto-optical media; and hardware devices that are specially configured to store or to store and execute program code, such as ASICs, programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A biometric identification method comprising:
    receiving input data comprising spatial and temporal pressure data that has been generated in response to a user exerting pressure on a pressure sensor by pressing down the pressure sensor, the pressure sensor comprising a plurality of regions, wherein the at least some of the spatial and temporal pressure data has been recorded in frames, each frame being assigned an activity level based on a set of active pixels, the activity level being defined by pressure data that has been averaged within a region to determine the highest number of pixels exceeding a threshold;
    using the set of active pixels to map an orientation into another orientation to account for tilting of a reference frame;
    using the input data to identify one or more patterns associated with the plurality of regions;
    associating the one or more patterns with one or more characteristics; and
    using the one or more characteristics to identify the user.

2. The biometric identification method according to claim 1, further comprising:
    comparing the one or more patterns to patterns that have been obtained in a training phase by a trained model that is updated based on successfully learned characteristics;
    based on the comparison, calculating a probability that the one or more patterns match the one or more characteristics; and
    in response to the probability satisfying a threshold, authenticating the user.

3. The biometric identification method according to claim 1, wherein the input data comprises fused data from two or more sensors.

4. The biometric identification method according to claim 1, wherein the spatial and temporal pressure data has been acquired at varying sampling rates.

5. The biometric identification method according to claim 1, further comprising clustering pixels the set of active pixels into an active region.

6. The method according to claim 1, further comprising assigning to elements in the plurality of regions weight factors based on a set of predetermined criteria.

7. The biometric identification method according to claim 6, further comprising adjusting the weight factors to account for at least one of a user-related or not user-related tolerance that causes variations in the pressure.

8. The biometric identification method according to claim 7, further comprising, in response to receiving data that is identical or highly accurate, using the data as in indication of an attack.

9. The biometric identification method according to claim 1, wherein using the input data comprises using contextual data to evaluate the input data.

10. The biometric identification method according to claim 1, further comprising evaluating sample-to-sample variations by comparing samples with a range of expected data.

11. The biometric identification method according to claim 1, further comprising selecting from among the spatial and temporal pressure data a set of data to serve as an orientation reference data set.

12. A biometric identification system comprising:
a pressure recorder that comprises a pressure sensor that comprises a plurality of regions, the pressure sensor receives input data comprising spatial and temporal pressure data that has been generated in response to a user exerting pressure on the pressure sensor by pressing down the pressure sensor, the pressure event being recorded and used to generate a user profile, wherein the spatial and temporal pressure data has been recorded in frames, each frame being assigned an activity level based on a set of active pixels in an active a region, the activity level being defined by pressure data that has been averaged within the region to determine the highest number of pixels exceeding a threshold;
using the set of active pixels to adjust a spatial orientation to account for tilting of a reference frame; and
one or more processors that, in response to receiving the spatial and temporal pressure data, performs steps comprising:
using a trained model that is updated based on successfully learned characteristics to identify one or more patterns associated with the plurality of regions;
associating the one or more patterns with one or more characteristics; and
using the one or more characteristics to identify the user.

13. The biometric identification system according to claim 12, wherein the biometric identification system is used to authenticate or identify the user in connection with at least one of an electronic commercial transaction, an Internet of Things (IoT) device, an automotive device, an identity and access management (IAM), or a robotic or high functioning touch sensing device.

14. The biometric identification system according to claim 12, further comprising assigning to elements in plurality of regions weight factors based on a set of predetermined criteria, and adjusting the weight factors to account for at least one of a user-related or not user-related tolerance that causes variations in the pressure.

15. The biometric identification system according to claim 12, further comprising reducing a computational burden by selecting among the frames those frames that have the highest number of active pixels that exceed the threshold.

16. The biometric identification system according to claim 12, further comprising filtering pixel data to determine pixel boundaries for a buffer that is used to perform one or more computations to output a list of hybrid buffers comprising information about the pixel boundaries.

* * * * *